(12) United States Patent
Unno et al.

(10) Patent No.: US 10,250,128 B2
(45) Date of Patent: Apr. 2, 2019

(54) TYPE III SWITCHING CONVERTER ERROR AMPLIFIER WITH FAST TRANSIENT RESPONSE BEHAVIOR

(71) Applicant: Dialog Semiconductor (UK) Limited, London (GB)

(72) Inventors: Naoyuki Unno, Kanagawa (JP); Soichiro Ohyama, Kanagawa (JP); Hidenori Kobayashi, Kanagawa (JP)

(73) Assignee: Dialog Semiconductor (UK) Limited, London (GB)

( * ) Notice: Subject to any disclaimer, the term of this patent is extended or adjusted under 35 U.S.C. 154(b) by 376 days.

(21) Appl. No.: 15/064,676

(22) Filed: Mar. 9, 2016

(65) Prior Publication Data
US 2017/0264190 A1 Sep. 14, 2017

(51) Int. Cl.
*H02M 3/04* (2006.01)
*H02M 3/156* (2006.01)

(52) U.S. Cl.
CPC ............ *H02M 3/04* (2013.01); *H02M 3/156* (2013.01); *H02M 2003/1566* (2013.01)

(58) Field of Classification Search
CPC . H02M 3/04; H02M 3/156; H02M 2003/1566
See application file for complete search history.

(56) References Cited

U.S. PATENT DOCUMENTS 6,552,517 B1 * 4/2003 Ribellino ................ H02M 1/36
323/282
7,253,593 B1 * 8/2007 Chen ..................... H02M 3/158
323/224
7,518,348 B1 * 4/2009 Kobayashi ............ H02M 3/156
323/222

(Continued)

FOREIGN PATENT DOCUMENTS

WO    WO 2014/203020    12/2014

OTHER PUBLICATIONS

Analog Circuit Design, Low Voltage Low Power; Short Range Wireless Front-Ends; Power Management and DC-DC, Copyright 2012, pp. 321-338, Springer Dordrecht Heidelberg London New York, ISBN 978-94-007-1925-5.

(Continued)

*Primary Examiner* — Zeev V Kitov
(74) *Attorney, Agent, or Firm* — Saile Ackerman LLC; Stephen B. Ackerman; Billy Knowles (57) ABSTRACT

A transient response circuit provides faster transient response time of an electronic device so that less overshoot or undershoot of an output signal of the electronic device occurs when a large load and/or line transient signal is present at an input and/or output terminal of the electronic device. The transient response circuit has a transient detection circuit and an assist circuit. The transient detection circuit monitors a feedback signal applied to an input terminal of the control stage, and generates transient detection signals indicating that detection of a large load and/or line transient signal has occurred. The assist circuit communicates receives the transient detection signal and charges or discharges a loop filter capacitor of the control stage for causing the control stage to regulate the output signal to decrease overshoot or undershoot upon receipt of the transient detection signal.

14 Claims, 6 Drawing Sheets

(56) References Cited

U.S. PATENT DOCUMENTS

| | | | |
|---|---|---|---|
| 7,586,767 B1 | 9/2009 | Prodic et al. | |
| 7,605,576 B2 | 10/2009 | Kanakubo | |
| 7,622,820 B1 | 11/2009 | Prodic et al. | |
| 7,834,608 B2 | 11/2010 | Cheng et al. | |
| 8,036,762 B1 | 10/2011 | Young et al. | |
| 8,330,437 B1 * | 12/2012 | Hartman | H02M 3/1588 323/222 |
| 8,698,463 B2 * | 4/2014 | Dwarakanath | H02M 3/1582 323/259 |
| 9,602,001 B1 * | 3/2017 | Hung | H02M 3/158 |
| 2010/0033146 A1 * | 2/2010 | Irissou | H02M 3/156 323/282 |

OTHER PUBLICATIONS

"Near-Optimum Dynamic Regulation of DC-DC Converters Using Feed-Forward of Output Current and Input Voltage with Current-Mode Control," by Richard Redl et al., IEEE Transactions on Power Electronics, vol. PE-1, No. 3, Jul. 1986, pp. 181-192.

"Optimal Feed-Forward Compensation for PWM DC/DC Converters with "Linear" and "Quadratic" Conversion Ratio," by Luigi Calderone et al., IEEE Transactions on Power Electronics, vol. 7, No. 2, Apr. 1992, pp. 349-355.

"Optimizing the Load Transient Response of the Buck Converter," by Richard Redl et al., IEEE Applied Power Electronics Conference and Exposition, 1998. APEC '98. Thirteenth Annual Conference Proceedings 1998, (vol. 1 ), Feb. 15, 1998, pp. 170-176.

"Hybrid Buck-Boost Feedforward and Reduced Average Inductor Current Techniques in Fast Line Transient and High-Efficiency Buck-Boost Converter," IEEE Transactions on Power Electronics, vol. 25, No. 3, Mar. 2010, pp. 719-730.

"Demystifying Type II and Type III Compensators Using Op-Amp and OTA for DC/DC Converters," Texas Instruments Application Report SLVA662, Jul. 2014, pp. 1-15, SW LEE, Power Management.

German Office Action, File No. 10 2016 204 772.8, Applicant: Dialog Semiconductor (UK) Limited, dated Dec. 23, 2016, 6 pgs and English language translation, 7 pgs.

\* cited by examiner

TYPE III SWITCHING CONVERTER ERROR AMPLIFIER WITH FAST TRANSIENT RESPONSE BEHAVIOR

TECHNICAL FIELD

This disclosure relates generally to differential error amplifiers. More particularly, this disclosure relates to differential error amplifiers having a fast transient response. Even more particularly, this disclosure relates to an error amplifier within a control stage of a DC/DC switching power converter.

BACKGROUND

Type III compensation is often used for the voltage-mode control DC/DC switching power converter to achieve wider bandwidth than the inductor-capacitor (LC) resonant frequency of the DC/DC switching power converter. "Demystifying Type II and Type III Compensators Using Op-Amp and OTA for DC/DC Converters", S. W. Lee, Texas Instruments Application Report—SLVA662, July, 2014, states that the purpose of adding compensation to the error amplifier of a DC/DC switching power converter is to counteract some of the gains and phases contained in the control-to-output transfer function. The gains and phases may jeopardize the stability of the DC/DC switching power converter. The ultimate goal is to make the overall closed-loop-transfer function (control-to-output cascaded with the error amplifier) satisfy the stability criteria.

A Type I compensation has a single pole based on a feedback capacitor and resistor at the input of an operational amplifier or an impedance at an output of an operational transconductance amplifier with the resistor or resistors at the input of the operational transconductance amplifier. A Type II compensation has two poles and adds an resistor-capacitance (RC) branch to flatten the gain, and improve the phase response in the mid-frequency range. The increased phase is achieved by increasing the separation of the pole and zero of the compensation. A Type III compensation has two poles, besides the pole-at-zero and two zeros. The Type III compensation is used when more than 90 degrees of phase boost is necessary. By adding another pole/zero pair to the Type II compensation, the Type III compensation can theoretically boost the phase up to 180 degrees.

Figure 1A:
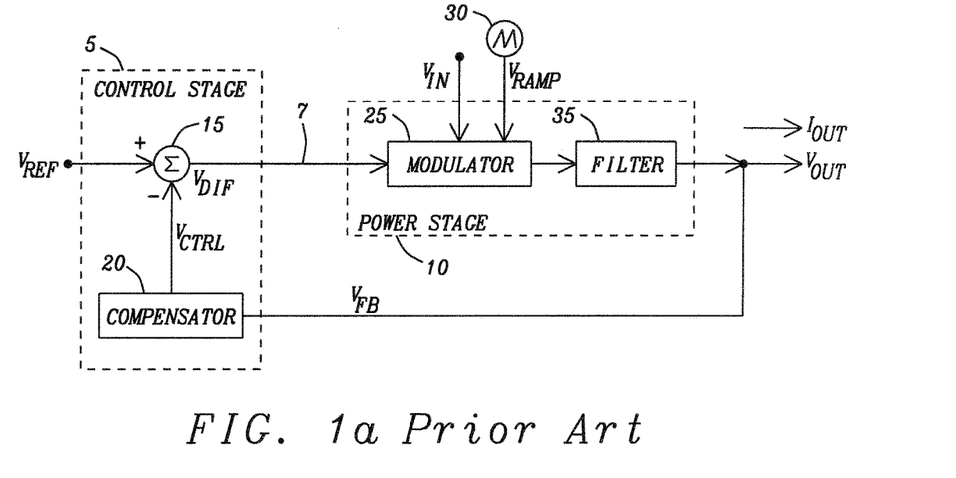
FIG. 1a is a block diagram of a switch mode DC/DC power converter of the related art.
Figure 1B:
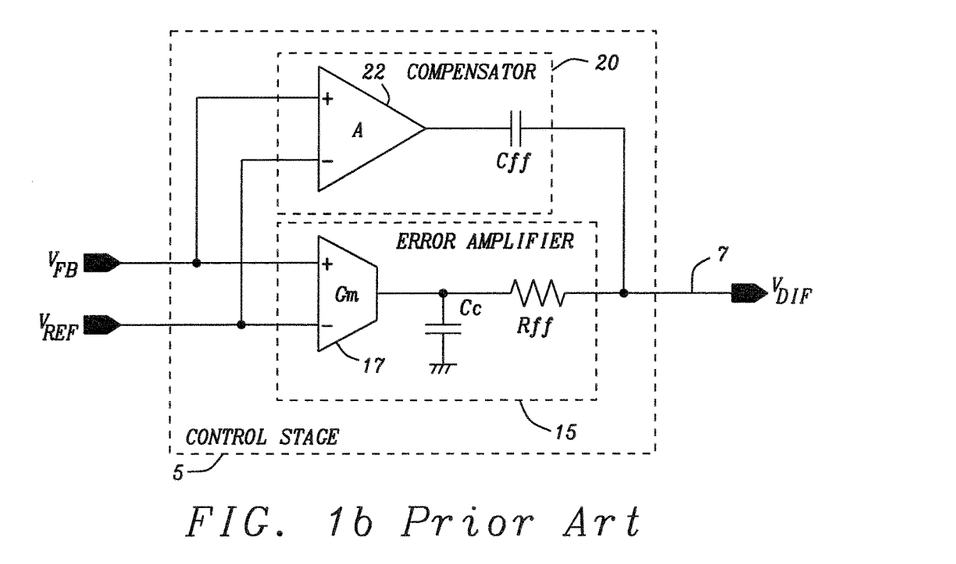

FIG. 1a is a block diagram of a switch mode DC/DC power converter of the related art. FIG. 1b is a schematic diagram of a control stage 5 of the switch mode DC/DC power converter of the related art of FIG. 1a. Referring to FIG. 1a, a switch mode DC/DC power converter transfers power from a source $V_{IN}$ to a load while converting voltage and current applied to the input of the circuit to an output voltage $V_{OUT}$ and current $I_{OUT}$ suitable for the load. The switch mode DC/DC power converter consist of a control stage 5 and a power stage 10. The control stage 5 receives necessary feedback signals from the power stage 10 and a reference voltage $V_{REF}$ and control signals from system operating functions. The feedback signal $V_{FB}$ is applied to a compensator 20 to correct the phase and gain of the feedback signal $V_{FB}$. The compensated feedback signal $V_{CTRL}$ is applied to an error amplifier 15 for determining the difference between the compensated feedback signal $V_{CTRL}$ and the reference voltage $V_{REF}$. The output terminal 7 of the error amplifier 15 transfers the difference output voltage $V_{DIF}$ to be applied to the modulator 25 of the power stage 10. The modulator 25 compares the difference output voltage $V_{DIF}$ with a ramp voltage $V_{RAMP}$ to determine a pulse width of the modulated input voltage $V_{MOD}$. The modulated input voltage $V_{MOD}$ is applied to the filter 35 for removing the high frequency content from the modulated input voltage $V_{MOD}$ for determining the output voltage $V_{OUT}$ of the switch mode DC/DC power converter.

Referring to FIG. 1b, the error amplifier 15 of the control stage 5 has a transconductance amplifier 17. The transconductance amplifier 17 receives the feedback signal $V_{FB}$ at its inverting terminal (−) and the reference voltage $V_{REF}$ at its noninverting terminal (+). The output of the transconductance amplifier 17 is connected to a first terminal of the feedforward resistor $R_{ff}$ and the first terminal of the compensation capacitor $C_c$. The second terminal of the compensation capacitor $C_c$ is connected to the ground reference voltage. The second terminal of feed forward resistor $R_{ff}$ is connected to the output terminal 7 of the error amplifier 15 for providing the difference output voltage $V_{DIF}$ to the power stage 10.

The compensator 20 adds feedforward compensation that increase the phase margin, defined as the difference between the unity-gain phase shift and −180 degrees, which is the point where the loop becomes unstable.

The finite gain or low gain amplifier 22 receives the feedback signal $V_{FB}$ at its inverting terminal (−) and the reference voltage $V_{REF}$ at its noninverting terminal (+). The output of the finite gain amplifier 22 is connected to the first terminal of the feedforward capacitor $C_{ff}$. The second terminal of the feedforward capacitor $C_{ff}$ is connected to the second terminal of the feed forward resistor $R_{ff}$ and connected to the output terminal 7 of the error amplifier 15 for providing the difference output voltage $V_{DIF}$ to the power stage 10.

Figure 1C:
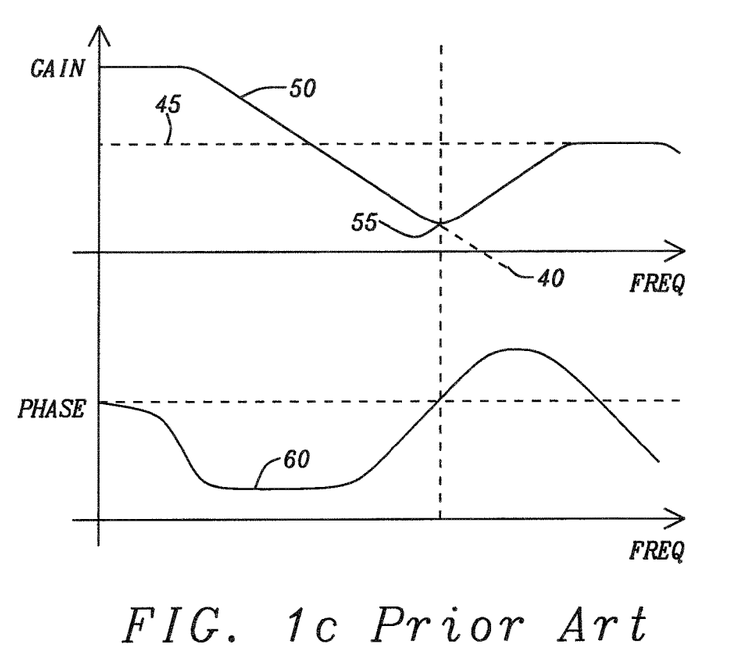

FIG. 1c is a plot of gain and phase vs. frequency of the control stage 5 of the switch mode DC/DC power converter of the related art of FIG. 1a. The plot 40 is the gain of the error amplifier 15 and the plot 45 is the gain of the compensator 20. The total gain of the control stage 5 is shown in the plot 50. The compensator 20 forms a Type III compensation that is often used for the switch mode DC/DC power converter to achieve wider bandwidth than the load inductor-capacitor (LC) resonant frequency. The two zeros 55 cancel the resonant frequency of the inductor and output capacitor, and 0-dB frequency of the whole control stage 5 can be higher than the resonant frequency. However, the feed-forward path of the compensator 20 is effective only during the feed-forward pole time constant (about 3 $C_{ff} R_{ff}$) and also the dynamic range is limited by the power supply voltage source VDD.

Figure 2:
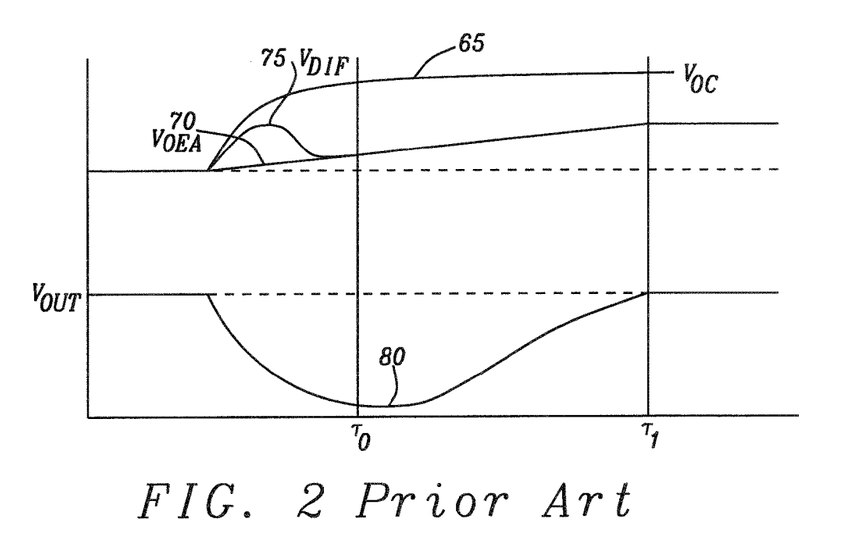
FIG. 2 is a plot of the large signal response of the error amplifier and output voltage of the switch mode DC/DC power converter of the related art of FIG. 1b.

FIG. 2 is a plot of the large signal response of the error amplifier 15 and output voltage $V_{OUT}$ of the switch mode DC/DC power converter of the related art of FIG. 1a. The plot 65 shows the output voltage $V_{OC}$ response of the compensator 20 to a large load and/or line transient. The plot 70 shows the output voltage $V_{OEA}$ of the error amplifier 15 and the plot 75 illustrates the output voltage $V_{DIF}$ of the control stage 5. The output voltage $V_{DIF}$ of the control stage 5 is the difference voltage between the reference voltage $V_{REF}$ and the voltage level of the compensated feedback signal $V_{CTRL}$.

When a load and/or line transient is large and/or long and the output voltage $V_{OUT}$ cannot be regulated while the feed-forward path of the compensator 20 is effective, the transient speed is restricted by the main pole, which is very slow, and an overshoot or undershoot 80 of the output voltage $V_{OUT}$ during the transient becomes large in the time prior to the time $\tau_0$. When the output voltage $V_{OC}$ response of the compensator 20 no longer increases, the output voltage $V_{OEA}$ of the error amplifier 15 begins to dominate at the time $\tau_0$ and the output voltage $V_{OUT}$ of the switch mode DC/DC power converter begins to raise to its required voltage level and the switch mode DC/DC power converter becomes regulated at the time $\tau_1$.

SUMMARY

An object of this disclosure is to provide a circuit for providing a faster transient response time of a switch mode DC/DC power converter and so that less overshoot or undershoot of the output voltage of the switch mode DC/DC power converter occurs when a load and/or line transient signal is large.

Another object of this disclosure is to provide a circuit and method for monitoring an input terminal of a control stage switch mode DC/DC power converter to detect if a large load and/or line transient signal occurs.

Further, another object of this disclosure is to provide a circuit and method for controlling circuitry accordingly for charging or discharging a loop filter capacitor faster.

To accomplish at least one of these objects, a control stage within a switch mode DC/DC power converter has a control loop monitor and an assist circuit. The control loop monitor configured for monitoring a difference between a feedback voltage developed from the output voltage of the switch mode DC/DC power converter and a reference voltage. The assist circuit is configured for charging or discharging a compensation capacitor more rapidly to cause the control stage to regulate the output voltage to decrease overshoot or undershoot.

The control loop monitor has a first offset voltage source and a second offset voltage source. A negative terminal of the first offset voltage source is connected to receive the reference voltage and the positive terminal of the first offset voltage source is connected to a noninverting terminal of a first comparator circuit. A positive terminal of the second offset voltage source is connected to receive the reference voltage and the negative terminal of the second offset voltage source is connected to an inverting terminal of a second comparator circuit. The first and second offset voltage sources set positive and negative voltage boundaries for the feedback voltage. The feedback voltage is applied to the noninverting terminals of the first and second comparators. When a large line and/or load transient occurs at the input voltage terminal and the output terminal of the switch mode DC/DC power converter, one of the first or second comparators will be activated and the output terminal of the activated comparator will have a signal level of a first logic state and the output terminal of the deactivated comparator will have a signal level of a second logic level. The output signal levels of the first and second comparators are decoded by a control loop monitor logic circuit that determines if any line and/or load transient is a large increase or a large decrease. The control loop monitor logic circuit generates output control signals for the assist circuit.

The assist circuit has a switched current source and a switched current sink. The switched current source and the switched current sink receive the output control signals for being activated or deactivated. The switched current source when activated sources current to the compensation capacitor for charging it more rapidly. The switched current sink when activated sinks current from the compensation capacitor for discharging it more rapidly. A first terminal of the switched current source is connected to a power supply voltage source and the second terminal of the switched current source is connected to a first terminal of the switched current sink. A second terminal of the switched current sink is connected to a ground reference voltage source.

The assist circuit further has a first switch and a second switch. The first switch has a first pole connected to an output of an error amplifier and second pole connected to the common terminal between the second terminal of the current source and the first terminal of the current sink. The second switch has a first pole connected to the output of a compensator of the control stage. A second pole of the second switch is connected to the common terminal common terminal between the second terminal of the current source and the first terminal of the current sink.

When the feedback voltage indicates a large positive transient, the control loop monitor detects the transient and activates the switched current source and either the first switch or the second switch to charge compensation capacitor more rapidly. When the feedback voltage indicates a large negative transient, the control loop monitor detects the transient and activates the switched current sink and either the first switch or the second switch to discharge the compensation capacitor through the feedforward resistor more rapidly.

In various embodiments of the present disclosure that accomplish at least one of these objectives, a switch mode DC/DC power converter includes a control stage within a switch mode DC/DC power converter has a control loop monitor and an assist circuit. The control loop monitor configured for monitoring a difference between a feedback voltage developed from the output voltage of the switch mode DC/DC power converter and a reference voltage. The assist circuit is configured for charging or discharging a compensation capacitor more rapidly to cause the control stage to regulate the output voltage to decrease a large overshoot or undershoot.

In various embodiments of the present disclosure that accomplish at least one of these objectives, a method for controlling a switch mode DC/DC power converter includes monitoring a control loop of the switch mode DC/DC power converter to determine a difference between a feedback voltage developed from the output voltage of the switch mode DC/DC power converter and a reference voltage. From the difference of the between a feedback voltage developed from the output voltage, assisting charging or discharging a compensation capacitor more rapidly to cause the control stage to regulate the output voltage to decrease the large overshoot or undershoot.

BRIEF DESCRIPTION OF THE DRAWINGS

FIG. 1b is a schematic diagram of a control stage of the switch mode DC/DC power converter of the related art of FIG. 1a.

FIG. 1c is a plot of gain and phase vs. frequency of the control stage 5 of the switch mode DC/DC power converter of the related art of FIG. 1a.

DETAILED DESCRIPTION

In the present disclosure, a transient response circuit and a method controls an electronic device such as a switch mode DC/DC power converter by monitoring a control loop of the switch mode DC/DC power converter to determine a difference between a feedback voltage developed from the output voltage of the switch mode DC/DC power converter and a reference voltage. From the difference of the between a feedback voltage developed from the output voltage, the circuit and method assists charging or discharging a compensation capacitor more rapidly to cause the control stage to regulate the output voltage to decrease overshoot or undershoot.

Figure 3:
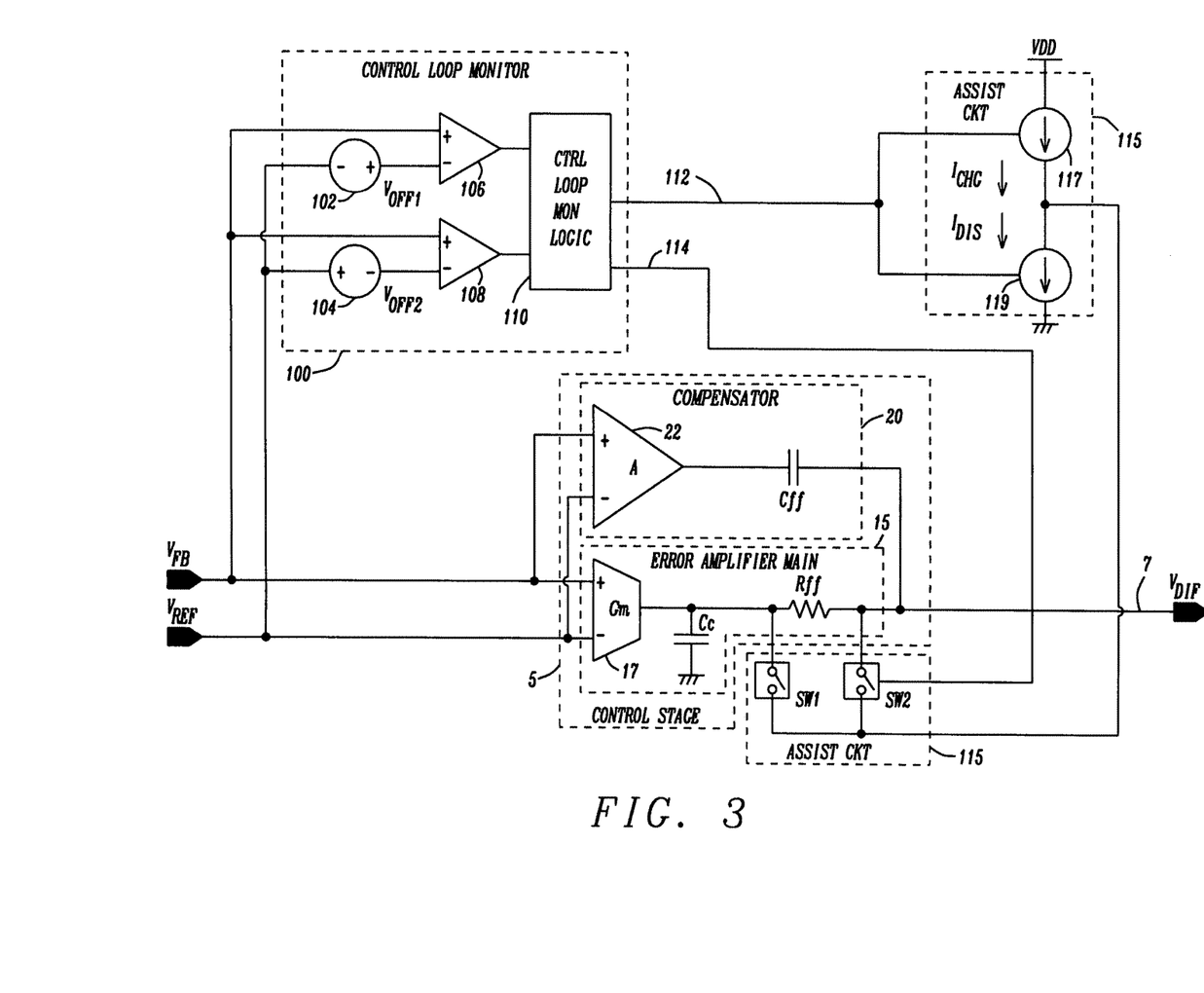
FIG. 3 is a schematic diagram of control stage as implemented for a switch mode DC/DC power converter of the present disclosure.

FIG. 3 is a schematic diagram of control stage 5 with a control loop monitor 100 and an assist circuit 115 as implemented for the electronic device such as the switch mode DC/DC power converter of the present disclosure. As described in FIG. 1a, the switched-mode power supply circuits consist of a control stage 5 and a power stage 10. The control stage 5 receives necessary feedback signals from the power stage 10 and a reference voltage $V_{REF}$ and control signals from system operating functions. The feedback signal $V_{FB}$ is applied to a compensator 20 to correct the phase and gain of the switched-mode power supply circuits consist of a control stage 5 and a power stage 10. The control stage 5 receives necessary feedback signals from the power stage 10 and a reference voltage $V_{REF}$ and control signals from system operating functions. The feedback signal $V_{FB}$ is applied to a compensator 20 to correct the phase and gain of feedback signal $V_{FB}$. The compensated feedback signal $V_{CTRL}$ is applied to an error amplifier 15 for determining the difference between the compensated feedback signal $V_{CTRL}$ and the reference voltage $V_{REF}$. The output terminal 7 of the error amplifier 15 transfers the difference output voltage $V_{DIF}$ to be applied to the modulator 25 of the power stage 10. In FIG. 3, the structure of the control stage 5 is as shown in FIG. 1b and has the identical labels. The control loop monitor 100 receives the feedback signal $V_{FB}$ and the reference voltage $V_{REF}$. The control loop monitor 100 is configured for determining that a large transient has occurred at the line and/or the load of the switch mode DC/DC power converter. The output 112 of the control loop monitor 100 is applied to the assist circuit 115. The assist circuit 115 is configured for charging or discharging the compensation capacitor $C_C$ more rapidly to cause the difference output voltage $V_{DIF}$ as applied to the modulator 25 of the power stage 10 to adjust the modulator more quickly to decrease large overshoot or undershoot of the output voltage $V_{OUT}$ of the switch mode DC/DC power converter.

The control loop monitor 100 has a first offset voltage source 102 and a second offset voltage source 104. A negative terminal of the first offset voltage source 102 is connected to receive the reference voltage $V_{REF}$ and the positive terminal of the first offset voltage source 102 is connected to a inverting terminal of a first comparator circuit 106. A positive terminal of the second offset voltage source 104 is connected to receive the reference voltage $V_{REF}$ and the negative terminal of the second offset voltage source 104 is connected to an inverting terminal of a second comparator circuit 108. The first and second offset voltage sources 102 and 104 set positive and negative voltage boundaries for the feedback signal $V_{FB}$. The feedback signal $V_{FB}$ is applied to the noninverting terminals of the first and second comparators 106 and 108. When a large line and/or load transient occurs at the input voltage terminal $V_{IN}$ or the output terminal $V_{OUT}$ of the switch mode DC/DC power converter as shown in FIG. 1a, one of the first or second comparators 106 and 108 will be activated and the output terminal of the activated comparator will have a signal level of a first logic state and the output terminal of the deactivated comparator will have a signal level of a second logic level. The output signal levels of the first and second comparators are decoded by a control loop monitor logic circuit 110 that determines if any line and/or load transient is a large increase or a large decrease. The control loop monitor logic circuit 110 generates output control signals 112 and 114 for the assist circuit 115.

The assist circuit 115 has a switched current source 117 and a switched current sink 119. The switched current source 117 and a switched current sink 119 receive the output control signals 112 for being activated or deactivated. The switched current source 117, when activated, sources current to the compensation capacitor $C_C$ for charging it more rapidly. The switched current sink 119, when activated sinks current from the compensation capacitor $C_C$ for discharging it more rapidly. A first terminal of the switched current source 117 is connected to a power supply voltage source VDD and the second terminal of the switched current source 117 is connected to a first terminal of the switched current sink 119. A second terminal of the switched current sink 119 is connected to a ground reference voltage source.

The assist circuit 115, further, has a first switch SW1 and a second switch SW2. The first switch SW1 has a first pole connected to the output of transconductance amplifier 17 and second pole connected to the common terminal between the second terminal of the current source 117 and the first terminal of the current sink 119. The second switch SW2 has a first pole connected to the output of a compensator 20 of the control stage 5. A second pole of the second switch SW2 is connected to the common terminal common terminal between the second terminal of the current source 117 and the first terminal of the current sink 119. The control terminals of the first switch SW1 and second switch SW2 are connected to the output control signal 114 of the control loop monitor logic circuit 110 for activating and deactivating the first switch SW1 and second switch SW2.

When the feedback signal $V_{FB}$ indicates a large positive load transient or negative line transient, the control loop monitor 100 detects the transient and activates the switched current source 117 and either the first switch SW1 or the second switch SW2 to charge compensation capacitor $C_C$ more rapidly. When the feedback signal $V_{FB}$ indicates a large negative transient, the control loop monitor 100 detects the transient and activates the switched current sink 119 and either the first switch SW1 or the second switch SW2 to discharge the compensation capacitor $C_C$ through the feedforward resistor more rapidly.

The control loop monitor 100 controls the time that the assist circuit 115 operates. There are two cases about how long this assist circuit 115 works. In the first case, the assist circuit 115 works for a fixed period of time only when the large signal response is detected by the control loop monitor 100. The second case, the assist circuit 115 works continuously until the difference between the feedback signal $V_{FB}$ and the reference voltage $V_{REF}$ becomes less than the comparator input offset determined by the first and second offset voltage sources 102 and 104.

Figure 4:
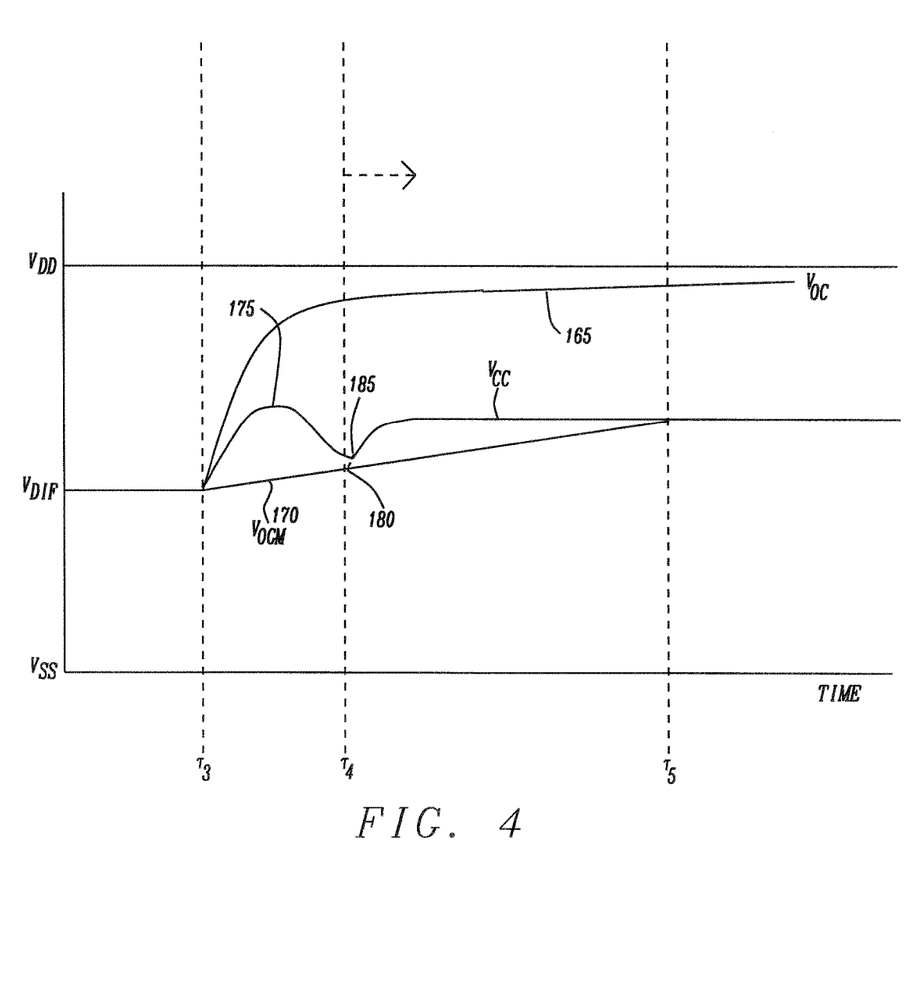
FIG. 4 is a plot of the behaviour of the control stage of FIG. 3 within the switch mode DC/DC power converter of the present disclosure.

FIG. 4 is a plot of the behaviour of the control stage of FIG. 3 within the switch mode DC/DC power converter of the present disclosure. The plot 165 illustrates the voltage of the output voltage $V_{OC}$ response of the compensator 20 to a large load and/or line transient. The plot 170 shows the output voltage $V_{OGM}$ of the transconductance amplifier 15 and the plot 175 illustrates the output voltage $V_{DIF}$ of the control stage 5. The plot 180 illustrates the voltage $V_{CC}$ developed at the second terminal of the compensation capacitor $C_C$ during a charge or discharge of the compensation capacitor $C_C$ during a large transient of the line and/or load at the output of the switch mode DC/DC power converter. The output voltage $V_{DIF}$ of the control stage 5 is the additive sum of the output voltage $V_{OC}$ of the compensator 20, the output voltage $V_{OEA}$ of the transconductance amplifier 17, and the voltage $V_{CC}$ at the output of the compensation capacitor $C_C$.

When the feedback signal $V_{FB}$ indicates a large positive transient, the output voltage $V_{DIF}$ of the control stage 5 begins to rise at approximately the time $\tau_3$ controlled by the output voltage $V_{OC}$ response of the compensator 20. When the output voltage $V_{OC}$ is no longer rising 175, the output voltage $V_{DIF}$ begins to fall at approximately the time $\tau_4$ and the control loop monitor 100 activates the assist circuit 115 to charge the compensation capacitor $C_C$ more rapidly. The voltage $V_{CC}$ at the second terminal of the compensation capacitor $C_C$ begins to rise and the output voltage $V_{DIF}$ of the control stage 5 rises with the voltage $V_{CC}$ from the point 185 until output voltage $V_{GM}$ of the transconductance amplifier 17 assumes control of the regulation of the output voltage $V_{OUT}$ of the switch mode DC/DC power converter at approximately the time $\tau_5$.

Figure 5:
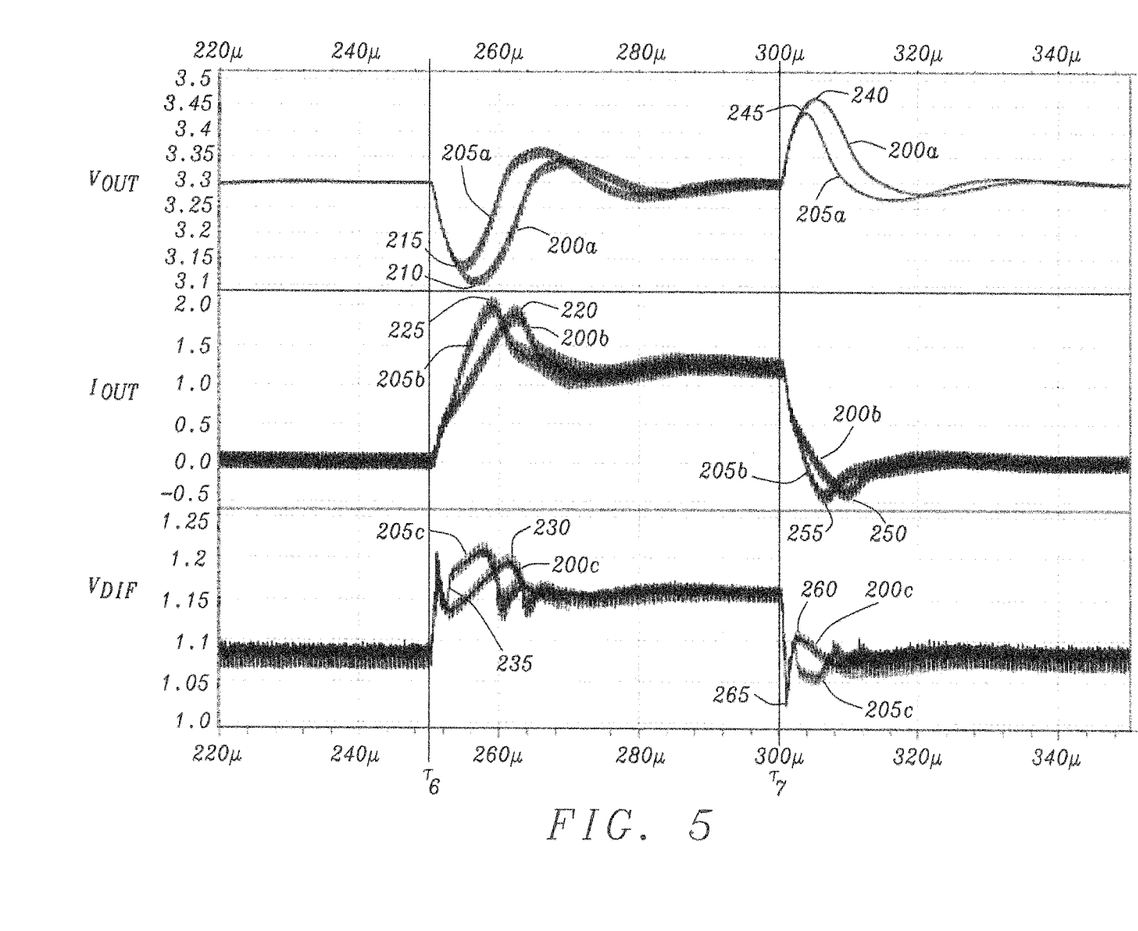
FIG. 5 is a plot of the load transient (1 mA to 0.8 A) with and without the control stage of the present disclosure of FIG. 3.

FIG. 5 is a plot of the load transient (1 mA to 0.8 A) with and without the control stage of the present disclosure of FIG. 3. The plot 200a shows the output voltage $V_{OUT}$ of the switch mode DC/DC power converter with the control stage 5 of the related art of FIG. 1b. The plot 200b shows the output current $I_{OUT}$ of the switch mode DC/DC power converter with the control stage 5 of the related art of FIG. 1b. The plot 200c shows the output voltage $V_{DIF}$ of the control stage 5 of the related art of FIG. 1b of the switch mode DC/DC power converter. The plot 205a shows the output voltage $V_{OUT}$ of the switch mode DC/DC power converter with the control stage 5 of this disclosure of FIG. 3. The plot 205b shows the output current $I_{OUT}$ of the switch mode DC/DC power converter with the control stage 5 of this disclosure of FIG. 3. The plot 205c shows the output voltage $V_{DIF}$ of the control stage 5 of this disclosure of FIG. 3 of the switch mode DC/DC power converter.

At approximately, the time $\tau_6$, the output current $I_{OUT}$ has a transient increase. The output current $I_{OUT}$ for the plot 200b rises to a peak at the point 220 and settles to a steady state. Similarly, the output current $I_{OUT}$ for the plot 205b rises to the point 225 and settles to a steady state. The output current $I_{OUT}$ of the plot 205b of the present disclosure occurs sooner than the output current $I_{OUT}$ of the plot 200b of the related art. The transient increase for the output current $I_{OUT}$ causes the output voltage $V_{OUT}$ to have an undershoot. The undershoot of the plot 200c causes the modulator 25 of FIG. 1a to respond more slowly thus causing the output voltage $V_{OUT}$ of plot 200a to become more negative 210 and last longer. The undershoot 215 of the voltage $V_{OUT}$ of plot 205a is detected by the control loop monitor 110 of FIG. 3 and the assist circuit 115 of FIG. 3 charges the compensation capacitor $C_C$ more quickly as shown in plot 205c at the point 235. This causes the voltage $V_{OUT}$ of plot 205a to be less negative 215 than the voltage $V_{OUT}$ of plot 200a and resume regulation more quickly.

At approximately, the time $\tau_7$, the output current $I_{OUT}$ has a transient decrease. The output current $I_{OUT}$ for the plot 200b falls to a negative peak at the point 250 and settles to a steady state. Similarly, the output current $I_{OUT}$ for the plot 205b falls to the point 255 and settles to a steady state. The output current $I_{OUT}$ of the plot 205b of the present disclosure occurs sooner than the output current $I_{OUT}$ of the plot 200b of the related art. The transient decrease for the output current $I_{OUT}$ causes the output voltage $V_{OUT}$ to have an overshoot. The overshoot 260 of the plot 200c causes the modulator 25 of FIG. 1a to respond more slowly thus causing the output voltage $V_{OUT}$ of plot 200a to become more positive 240 and last longer. The overshoot 245 of the voltage $V_{OUT}$ of plot 205a is detected by the control loop monitor 110 of FIG. 3 and the assist circuit 115 of FIG. 3 discharges the compensation capacitor $C_C$ through the feedforward resistor $R_{FF}$ more quickly as shown in plot 205c at the point 265. This causes the voltage $V_{OUT}$ of plot 205a to be less positive 245 than the voltage $V_{OUT}$ of plot 200a and resume regulation more quickly.

While the structure of these embodiments are applied to a switch mode DC/DC power converter, it will be apparent to one skilled in the art that any circuit application subject to external transient signal and employing an error amplifier will benefit from an error amplifier having the transient response circuit of the present disclosure. The transient response circuit is configured for monitoring a feedback signal from an output terminal of the electronic device and determining when a transient signal has occurred. The transient response circuit is further configured for more rapidly charging or discharging a compensation capacitor of the error amplifier. The transient response circuit charges of discharges the compensation capacitor for a fixed period of time during the transient signal or continuously until the transient response circuit detects that the transient signal has ended.

It will further be apparent that the physical implementation of the transient response function maybe realized as a digital circuit or a program process in a digital signal processor. The program process is encoded as digital signal and stored on a non-transient data recording media such a read only memory array for performing a method improving transient response behavior of an error amplifier in an electronic system such as a switch mode DC/DC power converter.

Figure 6:
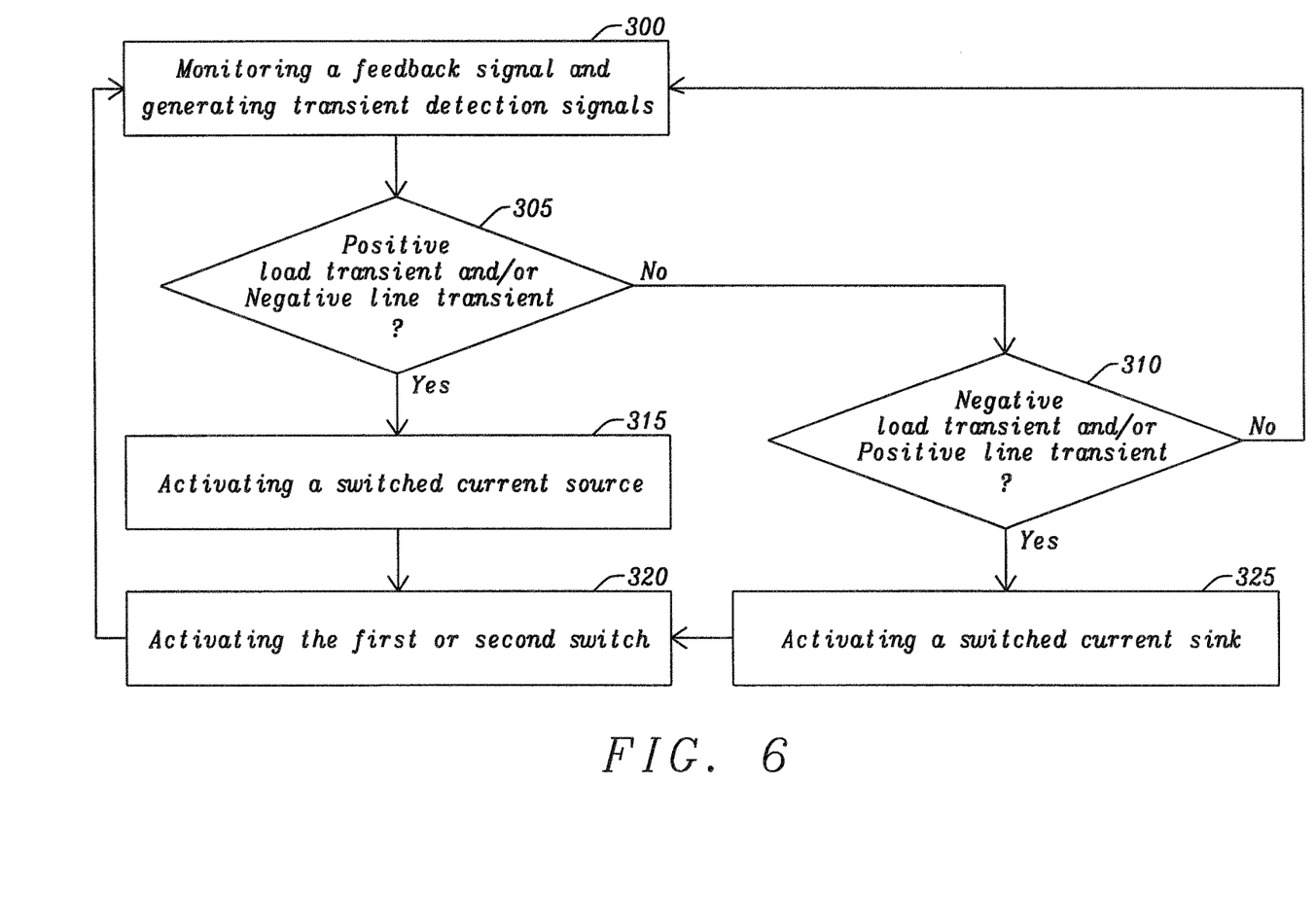
FIG. 6 is a flowchart for a method for operating a control stage of a switch mode DC/DC power converter for charging or discharging a compensation capacitor more rapidly to cause the control stage to decrease overshoot or undershoot of the present disclosure.

FIG. 6 is a flowchart for a method for operating a control stage of a switch mode DC/DC power converter for charging or discharging a compensation capacitor more rapidly to cause the control stage to decrease overshoot or undershoot of the present disclosure. The method begins with monitoring (Box 300) of a feedback signal $V_{FB}$ of FIG. 3 from an output of the switch mode DC/DC power converter. Transient detection signals are generated (Box 300) to indicate a large load and/or line transient. The detection signals are examined (Box 300) to determine that a large positive load transient or a large negative line transient has occurred. If the detection signals determine (Box 300) that a large positive load transient or a large negative line transient has occurred, a switched current source 117 of FIG. 3 is activated (Box 315).

If the detection signals determine (Box 300) that no large positive load transient or no large negative line transient has occurred, then the detection signals are examined (Box 310)

to determine that a large negative load transient or a large positive line transient has occurred. If the detection signals determine (Box 310) that a large negative load transient or a large positive line transient has not occurred, the monitoring (Box 300) of a feedback signal $V_{FB}$ of FIG. 3 from an output of the switch mode DC/DC power converter resumes. If the detection signals determine (Box 310) that a large negative load transient or a large positive line transient has occurred, a switched current sink 119 of FIG. 3 is activated (Box 325).

If the switched current source 117 or the switched current sink 119 is activated, the first switch SW1 or the second switch SW2 are turned on (Box 320) to charge compensation capacitor $C_C$ more rapidly. Upon activation (Box 320) of the first switch SW1 or the second switch SW2, the monitoring (Box 300) of a feedback signal $V_{FB}$ of FIG. 3 from an output of the switch mode DC/DC power converter is resumed.

While this disclosure has been particularly shown and described with reference to the preferred embodiments thereof, it will be understood by those skilled in the art that various changes in form and details may be made without departing from the spirit and scope of the disclosure.

What is claimed is:

1. A transient response circuit for providing a faster transient response time of an electronic device and so that less overshoot or undershoot of an output signal of the electronic device occurs when a large load and/or line transient signal is present at an input and/or output terminal of the electronic device, the transient response circuit comprising:
   a control loop monitor circuit for monitoring a feedback signal applied to an input terminal of a control stage of the electronic device, and configured for determining a difference between the feedback signal and the reference voltage offset by a first and a second offset voltage and configured for generating transient detection signals indicating that detection of a large load and/or line transient signal has occurred based on the difference between the feedback signal and the reference voltage offset by a first and a second offset voltage; and
   an assist circuit in communication with the transient detection circuit for receiving the transient detection signal, and configured for charging or discharging a loop filter capacitor of the control stage for regulating the output signal to decrease overshoot or undershoot upon receipt of the transient detection signal.

2. The transient response circuit of claim 1 wherein the electronic device is a switch mode DC/DC power converter.

3. The transient response circuit of claim 1 wherein the control loop monitor comprises:
   a first offset reference source configured for providing the first offset voltage, comprising:
      a negative terminal connected for receiving a first reference signal;
   a second offset reference source configured for providing the second offset voltage, comprising:
      a positive terminal connected for receiving the first reference signal;
   a first comparator comprising:
      a noninverting input terminal connected for receiving the feedback signal,
      an inverting input terminal connected to a positive terminal of the first offset reference source,
      a first comparing circuit for determining when the feedback signal is greater than the magnitude of the additive combination of the first reference signal and the first offset voltage for generating a first transient detection signal of a first logic state;
   a second comparator comprising:
      a noninverting input terminal connected for receiving the feedback signal,
      an inverting input terminal connected to a negative terminal of the second offset reference source,
      a second comparing circuit for determining when the feedback signal is greater than the magnitude of the subtractive combination of the first reference signal and the second offset voltage for generating a second transient detection signal of a first logic state; and
   a transient control circuit in communication with the first and second comparing circuits for receiving the first and second transient detection signals, configured for determining if any line and/or load transient signal is a large increase or a large decrease in magnitude, and configured for generating output control signals for activating the assist circuit.

4. The transient response circuit of claim 1 wherein the assist circuit comprises:
   a switched current source in communication with the transient control circuit for receiving a first of the output control signals for activating and deactivating the switched current source and connected to the loop filter capacitor of the control stage charging the loop filter capacitor for regulating the output signal to decrease overshoot or undershoot upon receipt of the transient detection signal;
   a switched current sink in communication with the transient control circuit for receiving a second of the output control signals for activating and deactivating the switched current sink and connected to the loop filter capacitor of the control stage discharging the loop filter capacitor for regulating the output signal to decrease overshoot or undershoot upon receipt of the transient detection signal;
   a first switch comprising:
      a first pole connected to an output of an error amplifier of the control stage, and
      a second pole connected to a common terminal between a second terminal of the current source and a first terminal of the current sink; and
   a second switch comprising:
      a first pole connected to an output of a compensator of the control stage, and
      a second pole connected to a common terminal between a second terminal of the current source and a first terminal of the current sink;
   wherein when the feedback voltage indicates a large positive transient, the control loop monitor detects the transient and activates the switched current source and the first switch or the second switch to charge compensation capacitor more rapidly; and
   wherein when the feedback voltage indicates a large negative transient, the control loop monitor detects the transient and activates the switched current sink and the first switch or the second switch to discharge the compensation capacitor through the feedforward resistor more rapidly.

5. A control stage within a power supply, comprising:
   a control loop monitor circuit for monitoring a feedback signal applied to an input terminal of the control stage of the power supply, and configured for determining a difference between the feedback signal and the reference voltage offset by a first and a second offset voltage and configured for generating transient detection signals indicating that detection of a large load and/or line transient signal has occurred based on the difference between the feedback signal and the reference voltage offset by a first and a second offset voltage; and an assist circuit in communication with the transient detection circuit for receiving the transient detection signal, and configured for charging or discharging a loop filter capacitor of the control stage for regulating the output signal to decrease overshoot or undershoot upon receipt of the transient detection signal.

6. The control stage of claim 5 wherein the control loop monitor comprises:

a first offset reference source configured for providing the first offset voltage, comprising:
   a negative terminal connected for receiving a first reference signal;

a second offset reference source configured for providing the second offset voltage, comprising:
   a positive terminal connected for receiving the first reference signal;

a first comparator comprising:
   a noninverting input terminal connected for receiving the feedback signal,
   an inverting input terminal connected to a positive terminal of the first offset reference source,
   a first comparing circuit for determining when the feedback signal is greater than the magnitude of the additive combination of the first reference signal and the first offset voltage for generating a first transient detection signal of a first logic state;

a second comparator comprising:
   a noninverting input terminal connected for receiving the feedback signal,
   an inverting input terminal connected to a negative terminal of the second offset reference source,
   a second comparing circuit for determining when the feedback signal is greater than the magnitude of the subtractive combination of the first reference signal and the second offset voltage for generating a second transient detection signal of a first logic state; and a transient control circuit in communication with the first and second comparing circuits for receiving the first and second transient detection signals, configured for determining if any line and/or load transient signal is a large increase or a large decrease in magnitude, and configured for generating output control signals for activating the assist circuit.

7. The control stage of claim 5 wherein the assist circuit comprises:

a switched current source in communication with the transient control circuit for receiving a first of the output control signals for activating and deactivating the switched current source and connected to the loop filter capacitor of the control stage charging the loop filter capacitor for regulating the output signal to decrease overshoot or undershoot upon receipt of the transient detection signal;

a switched current sink in communication with the transient control circuit for receiving a second of the output control signals for activating and deactivating the switched current sink and connected to the loop filter capacitor of the control stage discharging the loop filter capacitor for regulating the output signal to decrease overshoot or undershoot upon receipt of the transient detection signal;

a first switch comprising:
   a first pole connected to an output of an error amplifier of the control stage, and
   a second pole connected to a common terminal between a second terminal of the current source and a first terminal of the current sink; and a second switch comprising:
   a first pole connected to an output of a compensator of the control stage, and
   a second pole connected to a common terminal between a second terminal of the current source and a first terminal of the current sink;

wherein when the feedback voltage indicates a large positive transient, the control loop monitor detects the transient and activates the switched current source and the first switch or the second switch to charge compensation capacitor more rapidly; and wherein when the feedback voltage indicates a large negative transient, the control loop monitor detects the transient and activates the switched current sink and the first switch or the second switch to discharge the compensation capacitor through the feedforward resistor more rapidly.

8. A DC/DC power converter comprising:

a power stage configured for receiving an input power supply voltage and a ramp voltage, and configured for modulating the input supply voltage to convert the input power supply voltage to a modulated input supply voltage that is filtered to be an output voltage and current supplied to a load; and the control stage of claim 5 in communication with the power stage receiving the feedback signal and transmitting the control signal for regulating the regulate the output signal to decrease overshoot or undershoot of the output voltage of the power stage.

9. The DC/DC power converter of claim 8 wherein the control loop monitor comprises:

a first offset reference source configured for providing the first offset voltage, comprising:
   a negative terminal connected for receiving a first reference signal;

a second offset reference source configured for providing the second offset voltage, comprising:
   a positive terminal connected for receiving the first reference signal;

a first comparator comprising:
   a noninverting input terminal connected for receiving the feedback signal,
   an inverting input terminal connected to a positive terminal of the first offset reference source,
   a first comparing circuit for determining when the feedback signal is greater than the magnitude of the additive combination of the first reference signal and the first offset voltage for generating a first transient detection signal of a first logic state;

a second comparator comprising:
   a noninverting input terminal connected for receiving the feedback signal,
   an inverting input terminal connected to a negative terminal of the second offset reference source,
   a second comparing circuit for determining when the feedback signal is greater than the magnitude of the subtractive combination of the first reference signal and the second offset voltage for generating a second transient detection signal of a first logic state; and a transient control circuit in communication with the first and second comparing circuits for receiving the first and second transient detection signals, configured for determining if any line and/or load transient signal is a large increase or a large decrease in magnitude, and configured for generating output control signals for activating the assist circuit.

10. The DC/DC power converter of claim 8 wherein the assist circuit comprises:
a switched current source in communication with the transient control circuit for receiving a first of the output control signals for activating and deactivating the switched current source and connected to the loop filter capacitor of the control stage charging the loop filter capacitor for regulating the output voltage of the power stage to decrease overshoot or undershoot upon receipt of the transient detection signal;
a switched current sink in communication with the transient control circuit for receiving a second of the output control signals for activating and deactivating the switched current sink and connected to the loop filter capacitor of the control stage discharging the loop filter capacitor for regulating the output voltage of the power stage to decrease overshoot or undershoot upon receipt of the transient detection signal;
a first switch comprising:
a first pole connected to an output of an error amplifier of the control stage, and
a second pole connected to a common terminal between a second terminal of the current source and a first terminal of the current sink; and
a second switch comprising:
a first pole connected to an output of a compensator of the control stage, and
a second pole connected to a common terminal between a second terminal of the current source and a first terminal of the current sink;
wherein when the feedback voltage indicates a large positive transient, the control loop monitor detects the transient and activates the switched current source and the first switch or the second switch to charge compensation capacitor more rapidly; and
wherein when the feedback voltage indicates a large negative transient, the control loop monitor detects the transient and activates the switched current sink and the first switch or the second switch to discharge the compensation capacitor through the feedforward resistor more rapidly.

11. A method for controlling a switch mode DC/DC power converter providing a faster transient response time of the switch mode DC/DC power converter and so that less overshoot or undershoot of an output signal of the switch mode DC/DC power converter occurs when a large load and/or line transient signal is present at an input and/or output terminal of the electronic device, the method comprising the steps of:
monitoring a feedback signal applied to an input terminal of a control stage of the switch mode DC/DC power converter;
determining when the feedback signal is greater than the magnitude of the additive combination of a first reference voltage and a first offset voltage;
determining when the feedback signal is greater than the magnitude of the subtractive combination of the first reference voltage and a second offset voltage;
generating transient detection signals indicating that detection of a large load and/or line transient signal has occurred;
determining from the transient detection signals, if a loop filter capacitor of the control stage is to be charged or discharged; and
charging or discharging a loop filter capacitor of the control stage to cause the control stage to regulate the output signal to decrease overshoot or undershoot as determined from the transient detection signal.

12. The method of claim 11 wherein the step of monitoring a feedback signal comprises the steps of:
generating the first offset reference voltage;
generating the second offset reference voltage;
determining when the feedback signal is greater than the magnitude of the additive combination of the first reference voltage and the first offset voltage for generating a first transient detection signal of a first logic state;
determining when the feedback signal is greater than the magnitude of the subtractive combination of the first reference voltage and the second offset voltage for generating a second transient detection signal of a first logic state; and
determining from the first and second transient detection signals, if any line and/or load transient signal is a large increase or a large decrease in magnitude, and configured for generating output control signals for activating the assist circuit.

13. The method of claim 12 wherein the step of charging or discharging a loop filter capacitor of the control stage comprises the steps of:
selectively activating and deactivating a switched current source connected to the loop filter capacitor of the control stage for charging the loop filter capacitor for regulating the output signal to decrease overshoot or undershoot upon receipt of the transient detection signal;
selectively activating and deactivating a switched current sink connected to the loop filter capacitor of the control stage for discharging the loop filter capacitor for regulating the output signal to decrease overshoot or undershoot upon receipt of the transient detection signal.

14. The method of claim 12 wherein charging or discharging a loop filter capacitor of the control stage comprises the steps of:
when the first and second transient detection signals indicate a large positive transient, activating the switched current source and the first switch or the second switch to charge the compensation capacitor more rapidly; and
when the first and second transient detection signals indicate a large negative transient, activating the switched current sink and the first switch or the second switch to discharge the compensation capacitor through a feedforward resistor more rapidly.

\* \* \* \* \*